(12) United States Patent
Bastholm et al.

(10) Patent No.: US 6,509,705 B2
(45) Date of Patent: Jan. 21, 2003

(54) POWER SUPPLY FOR DC MOTORS

(75) Inventors: Jeppe Christian Bastholm, Sønderborg (DK); Kjeld Kristiansen, Sønderborg (DK)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 09/792,077

(22) Filed: Feb. 26, 2001

(65) Prior Publication Data

US 2002/0030457 A1 Mar. 14, 2002

(51) Int. Cl.[7] .............................................. H02K 17/32
(52) U.S. Cl. ........................ 318/434; 318/466; 318/803; 388/800; 388/806
(58) Field of Search ................................ 318/466, 434, 318/469, 803; 388/800, 806

(56) References Cited

U.S. PATENT DOCUMENTS 3,686,552 A * 8/1972 Peterson ...................... 318/434
5,652,825 A   7/1997 Schmider et al. ........... 388/822

FOREIGN PATENT DOCUMENTS

| EP | 0 945 976 A2 | 9/1999 |
| JP | 57135695 | 8/1982 |
| JP | 07236520 | 9/1995 |
| JP | 7274574 | 2/1996 |

* cited by examiner

Primary Examiner—Karen Masih
(74) Attorney, Agent, or Firm—Dykema Gossett, PLLC

(57) ABSTRACT

A power supply for DC motors, in particular for actuators for use in the adjustment of tables, beds and the like, comprises a transformer (T1) with a rectifier (D1–D4); and a buffer capacitor. The power supply comprises voltage limiting unit (Z1) coupled in parallel with the motor and connected to switch unit (Q1) so that the motor is connected on a first part of the sine half-waves, but is disconnected when the voltage determined for the voltage limiter is reached. This ensures a good mean voltage, and the voltage does not exceed an upper permissible value. This also means that the motor speed is more independent of the load, which is an advantage e.g. in case of height-adjustable tables. In an embodiment, the power supply comprises additional means for measuring the current power in the motor, and this measurement is used as a feedback for controlling the motor speed to keep the speed of the motor. Hereby, a constant motor speed is achieved for loads up to the maximum output of the transformer, and only then begins the speed to decrease. For example in case of height-adjustable tables, the user will see under normal conditions that the tabletop is raised and lowered at a constant speed.

12 Claims, 4 Drawing Sheets

POWER SUPPLY FOR DC MOTORS

Figure 1:
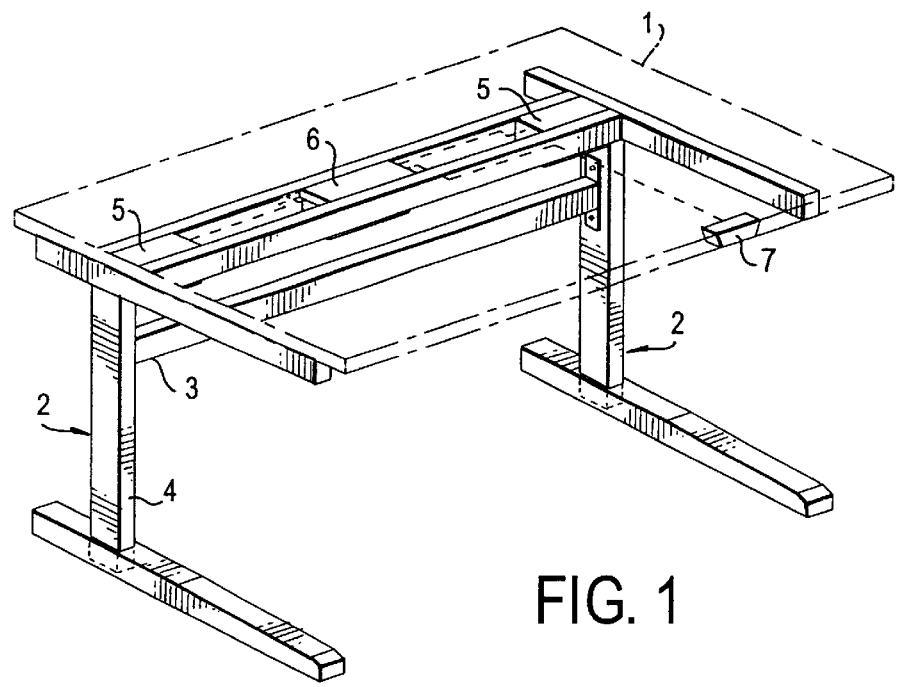

The present invention relates to a power supply for DC motors, in particular for actuators for use in the adjustment of tables, beds and similar furniture, said power supply comprising a transformer having a primary side for connection to a mains voltage (AC) and a secondary side with a rectifier and a buffer capacitor having a terminal for at least a DC motor and typically also a terminal for a control.

Linear actuators as independent installation components are used e.g. in furniture, hospital and nursing equipment, machinery and within the manufacturing industry for performing various movements and positional adjustments.

For a good working position at tables or table-like arrangements it is important that tho level of the tabletop can be adapted to the individual person and his working position, sitting or standing. This has previously been accomplished in connection with more sophisticated tables and equipment where the costs of the height adjustment itself have been of inferior importance. However, the focussing in recent years on working environment has meant that also more ordinary working tables, such as desks, must be adjustable in height. As a consequence, the price of the height adjustment has become a decisive factor. This had led to a new product field, viz. lifting columns for tables, it being intended to meet the specific requirements that are associated with tables. These lifting columns are typically based on linear actuators as a drive assembly incorporated in the lifting column, which usually consists of two telescopic links. With a control panel, which may a switch in its simplest form, the user can adjust the level of the tabletop as desired.

For reasons of safety and costs, the electrical equipment of linear actuators is a low volt equipment. In addition to this being justifiable in terms of safety, it means lower component costs and simpler procedures of approval, which allows the prices of the products to be kept at an acceptably low level.

As a power supply for linear actuators use is typically made of a transformer with full-wave rectification and smoothing capacitor, which is a simple, reliable and inexpensive power supply, but still has the drawback that the motor speed decreases relatively drastically with an increased load on the actuator. In most situations it is seen as natural and to be expected that the speed of the structure is reduced in step with the load. For lifting columns for tables this relatively great difference in speed between an empty table and a heavily loaded table is so great that the users see this as a drawback. Concretely, the task is thus to minimize this difference in speed for lifting columns within the given framework. For competitive reasons, the solution must be neutral in terms of costs or essentially neutral in terms of costs.

Since it is desired to leave the basic structure of the actuators unchanged, it is practically just possible to consider the power supply and the control of the motors. As the manufacturing costs relative to the solutions applied must be substantially neutral, then e.g. frequency control and switch mode power supply are left out beforehand, as these are expensive solutions.

Accordingly, the object of the invention is to provide a power supply which, in terms of manufacture, is not more expensive or noticeably more expensive than those traditionally used for linear actuators, and which addresses the problem of declining performance without exceeding the permissible voltages for a low voltage structure.

With this as a starting point, it has been contemplated how the utilization of the available output of a given transformer can be optimized while observing the permissible voltages. In accordance with the Danish high power regulation, the voltage on the secondary side of the transformer may not exceed 60 volts, while the voltage in a low volt installation may generally not exceed 42.4 volts.

The invention provides a power supply of the type stated in the opening paragraph which is characterized in that it comprises voltage limiting means coupled in parallel with the motor and connected to switch means, so that the motor is connected on a first part of the sine half-waves, but is disconnected when the voltage determined for the voltage limiter is reached.

Hereby, minimal losses may be achieved in the power supply, while ensuring a good mean voltage as the voltage does not exceed an upper permissible value. The voltage is thus limited in the power supply at lower loads relative to the traditional power supply. When the load reaches a certain size, the output decreases like in the traditional power supply as the transformer cannot supply sufficient voltage. In case of a linear actuator, this means that the speed decreases considerably less at low loads than with a traditional power supply, while the decrease in speed at greater loads, where the transformer cannot supply sufficient voltage, is of the same size as with a traditional power supply. For example in case of lifting columns for tables, this is a significant improvement over the known structures. That the speed decreases relatively more on the last section toward maximum load is readily logical to the user, and is instrumental in making the user hesitate to overload the structure.

The voltage limiting means are expediently formed by a Zener diode, which is a reliable and relatively inexpensive component. A diode having a Zener voltage corresponding to the desired limitation of the maximum voltage is selected. Preferably, a diode having a Zener voltage of or about 39 volts is selected, which gives a suitable safety margin up to the permissible 42.4 volts.

The switch means are expediently a FET transistor having a gate arranged such that current is supplied to the motor when the gate is high, while current to it is interrupted when the gate is low. FET transistors are likewise a reliable and inexpensive component. The FET transistor may be controlled by a controller consisting of transistors and resistors. The circuit is realized such that the FET transistor may be coupled entirely ON and OFF in a simple manner, as it is arranged as a low-side FET transistor. To avoid power losses in the FET transistor, a transformer with an expedient frequency characteristic may be selected.

As a particular feature, FET transistors are protected against external transients (surge and burst pulses) by a single Zener diode. The same Zener diode serves as a snubbe limiter for the secondary side of the transformer. The diode ensures that the FET transistor is controlled to suppress these undesired spikes. The main energy from these undesired voltage spikes is even transferred to the buffer capacitor. In addition it is ensured that the FET transistor is not subjected to voltages above specification limits.

Within the given limits of the voltages the invention allows transformers with a higher power (higher voltage) to be used—in concrete cases 20%. This potential may be utilized for a higher speed. For transformers that can be switched from 230 volts AC to 115 volts AC, the extra power may be also be utilized such that the input of 115 volts AC may comprise 100 volts AC.

As another option, the actuator speed may be increased by lowering the motor impedance or increasing the spindle pitch. For reasons of costs, motors with permanent magnets are typically used in linear actuators. To protect the magnets against demagnetization because of increased start current, a soft start may be made—current limitation or PWM controlled start of the motor. Soft start may be realized by allowed the motor to idle for a period prior to stop, controlled by HW (hardware) or SW (software).

It has been found, however, that soft start of the motor may be provided in a simple and inexpensive manner with a measuring resistor arranged in the controller in the motor output after the buffer capacitor. During start, the measuring resistor will limit the voltage to the motor until its full EMF (electromotive force) has been reached.

Another way of utilizing the invention is to regulate to a lower mean voltage, e.g. 33 volts, which allows actuators to be speed-limited at a low load. This results in a more uniform speed at varying loads and movement up and down at lifting columns.

It should also be mentioned that the circuits in the power supply may be designed such that thermal problems are exclusively attributed to the transformer which typically has a reconnectible fuse. Hereby, operating abuse, e.g. playing in terms of moving adjustable tables up and down, is not a thermal problem for the electronics.

Even in its simplest form, the structure should be able to meet the future demands on power factor. The power factor, however, may be improved by inserting an additional buffer capacitor in parallel with the rectifier, thereby achieving a further smoothing of the voltage. This capacitor is charged with the 60 volts from the rectifier. Connected, an inductance is inserted in series with the source of the FET transistor to the first buffer capacitor. In addition, the inductance is provided with an idle diode connected to the common positive power line. This means that the current is not interrupted abruptly, but that the current curve will have an inclined course during the interruption.

A further development of the invention consist in tapping current from precisely the same voltage level, where the front phase section is interrupted. This gives an additional current which is symmetrical with a peak at each end. The advantage is that the buffer capacitor is filled once more prior to zero crossing. This results in a lower voltage ripple and supplementary drawing of current from the transformer at voltage adaptation. The greatest benefit fit is a reduced ripple voltage at a lower desired output voltage. To this should be added reduced power loss in the transformer. This may be utilized for soft start and stop of the motor.

In general, the power supply is designed for highly efficient operation with very low power losses in the components.

In certain situations, it may be desirable or required to have simultaneous or alternative battery operation. This may be provided in that a reset signal for a lock in the control circuit is formed in a separate synchronization circuit.

For reasons of safety or according to customer specification it may be a requirement that the power supply is energyless when it is not used. This may be satisfied in that the FET transistor may be forced to be interrupted, controlled by the control electronics in general.

A special embodiment of the invention is defined in claim 11, where the power supply comprises means for measuring the current power in the motor, and this measurement is used as a feedback for adjusting the motor voltage so that the speed of the motor is kept constant.

By adjusting the motor voltage relative to the current power consumption of the motor, not only the speed difference is reduced, but the motor speed can be kept constant for loads in the range up to the maximum output of the transformer. The voltage is small at a low power consumption, and the voltage increases correspondingly at an increased power consumption. For lifting columns this means that the tabletop will move at the same speed, no matter whether the table is loaded or not, and no matter whether it is moved up or down. This applies until the maximum output of the transformer has been reached. In case of a greater load on the table, the speed will decrease like for a traditional power supply when the table is raised, but is lowered at the constant speed as the weight on the table causes a reduced load on the motor in this situation. The lowering speed is thus not faster at a great load, as is the case with the traditional power supply. This lower constant lowering speed is gentle to the structure and equipment on the table.

Furthermore, at least in lifting columns, the motor is provided with an overload protection which interrupts the current to the motor when it exceeds a maximum size. This overload protection incorporates a measuring circuit for measuring the current, and the signal from this may be utilized in the invention, so that the costs may additionally be kept down.

At a low load the motor speed will be smaller than what the power supply can yield, viz. corresponding to the speed at a maximum load. This will be satisfactory in most cases. If a higher speed is desired, then, where the motor/transformer output so permits, compensation for this may be achieved through the mechanical transmission, e.g. a spindle with a greater screw pitch may be selected for linear actuators.

In summary, the power losses are kept down in the circuit because of the general focus on a high efficiency in the entire working range of the power supply. The average power supply is estimated to be above 95–98%, excluding the efficiency of the transformer. The circuit is realized such that the FET transistor may be coupled entirely On and OFF in a simple manner, as it is arranged as a low-side FET. The circuit is realized such that it is possible to control/regulate the output voltage. The circuit protects against excess voltage relative to the requirement of the low voltage regulation with respect to maximum voltage peaks of 42.4 volts. Thanks to the circuit the designer of the actuator has a greater freedom in choosing between motors and spindle pitches. The circuit may contribute to ensuring a long service life for the relays in the H-bridges.

Figure 3:
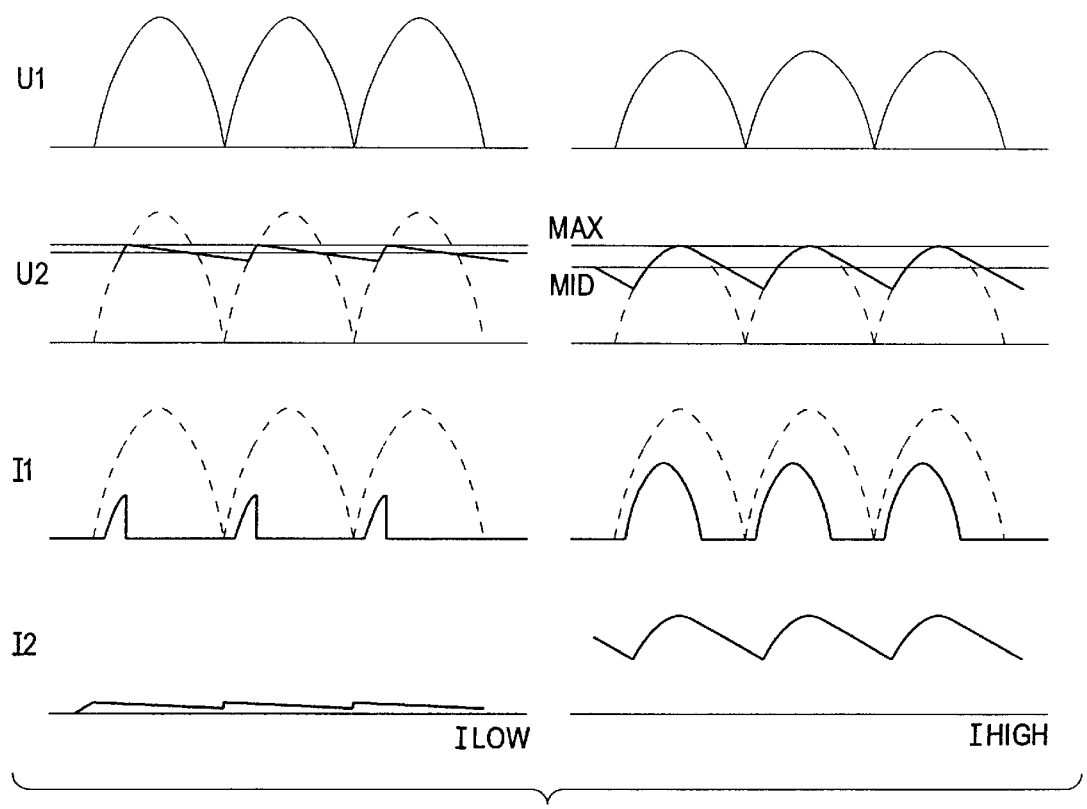
Figure 2:
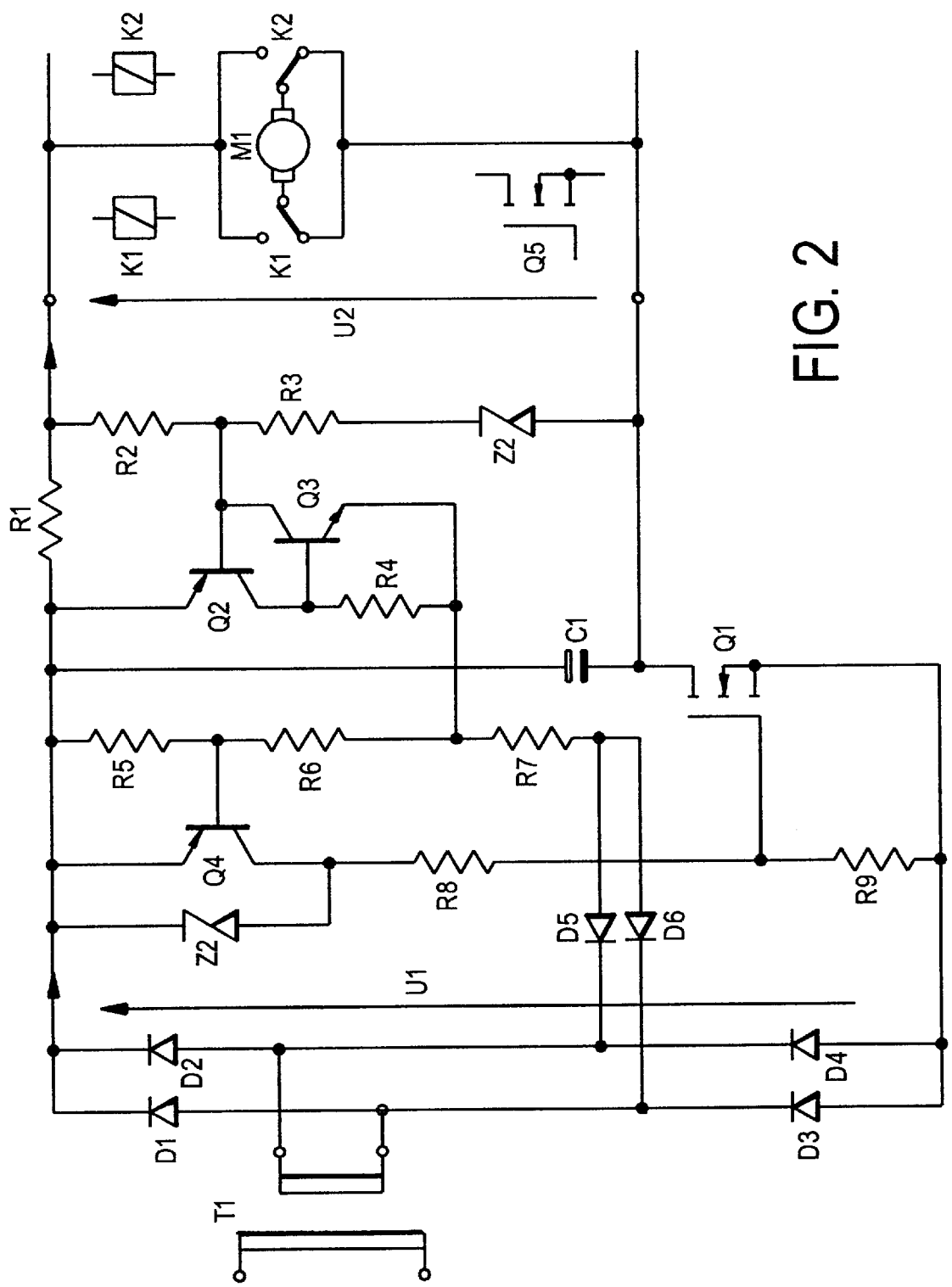
Figure 4:
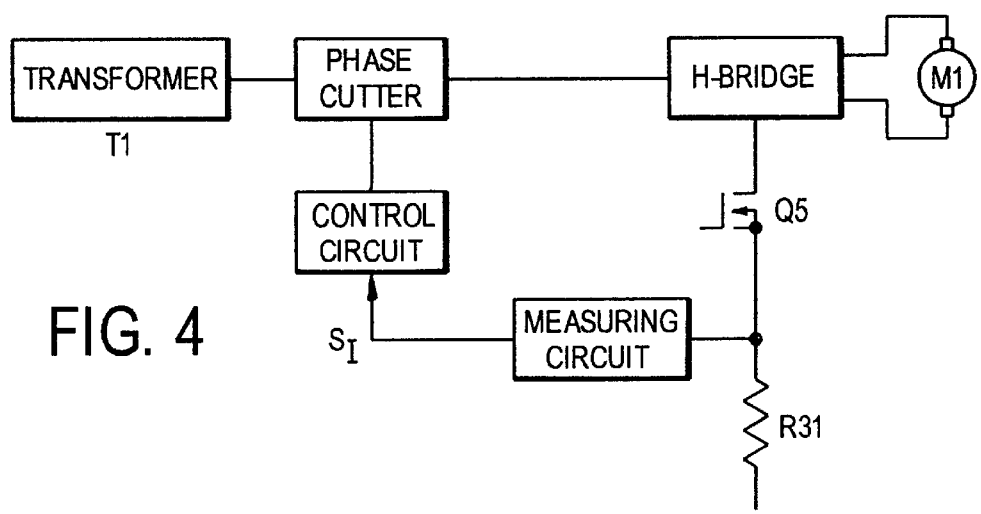
Figure 5:
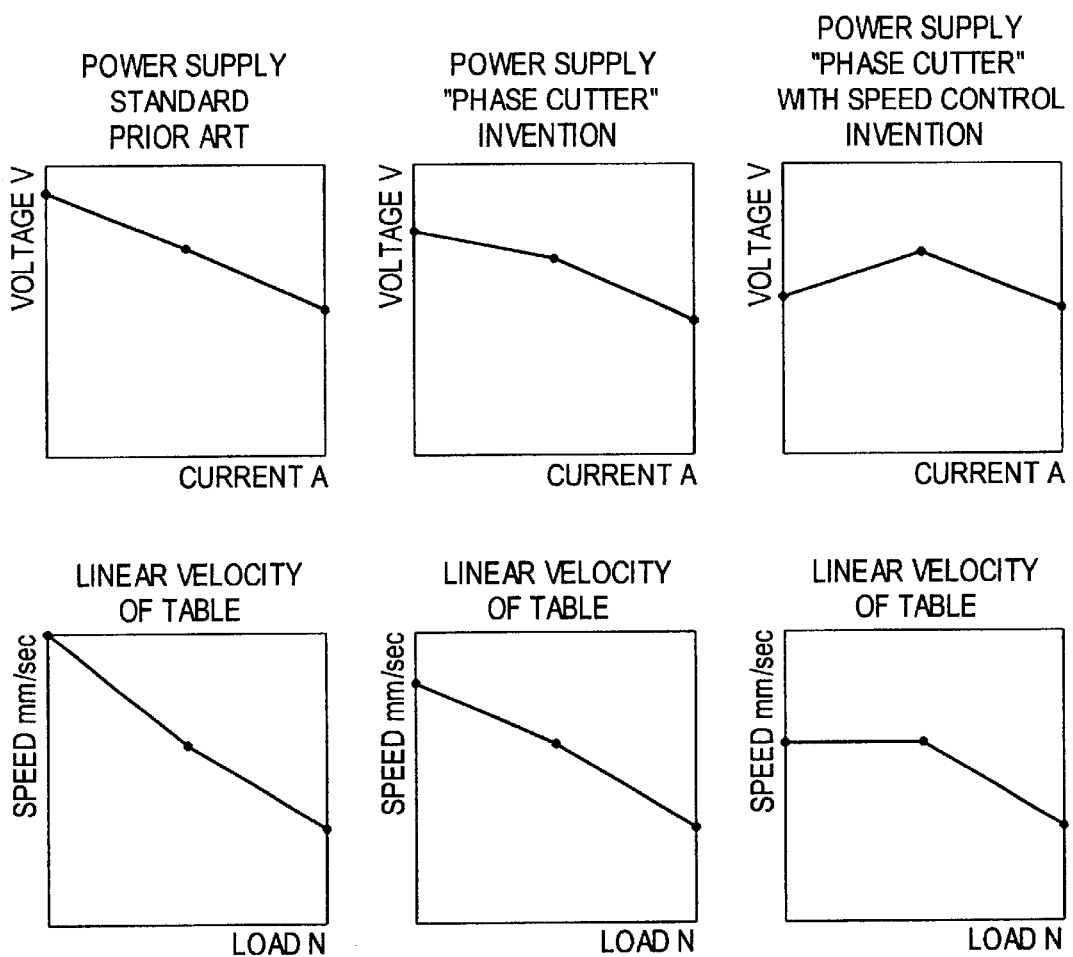
Figure 6:
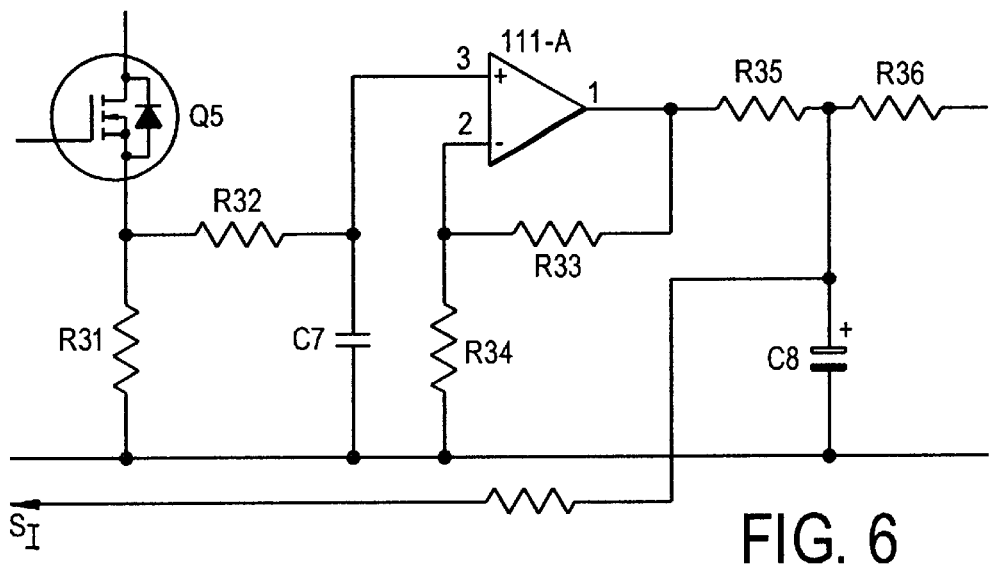
Figure 7:
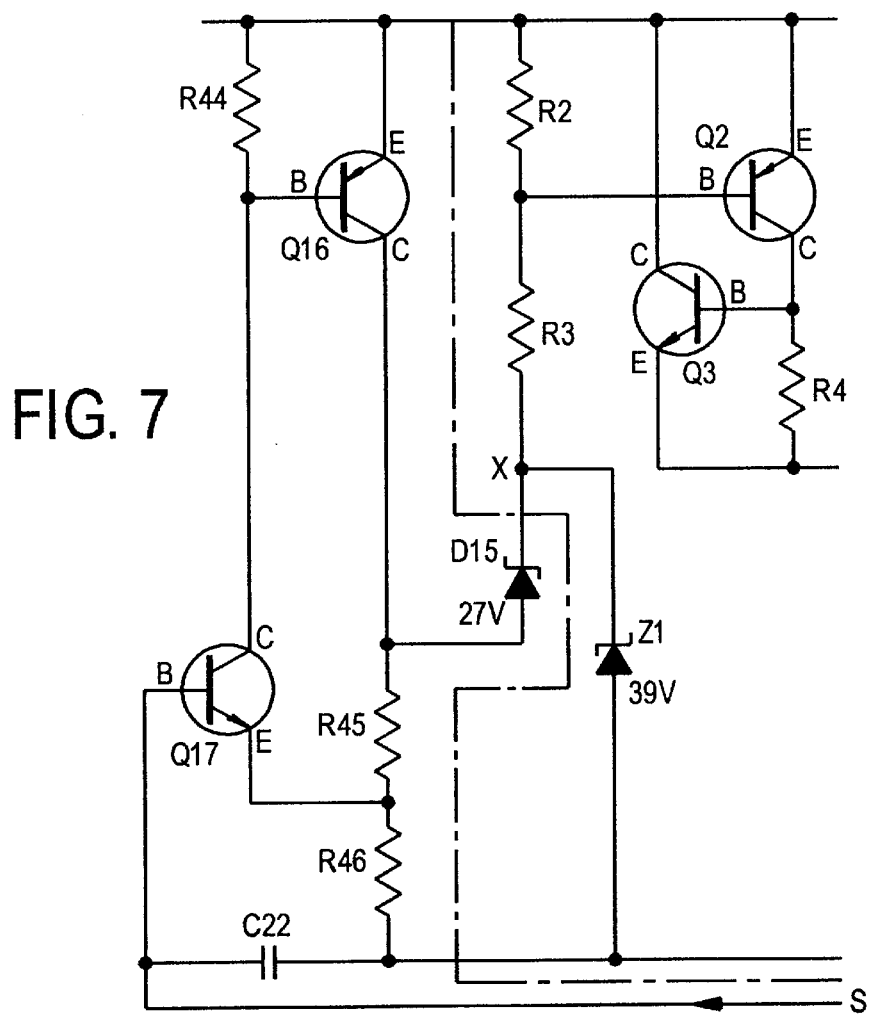
Figure 2:
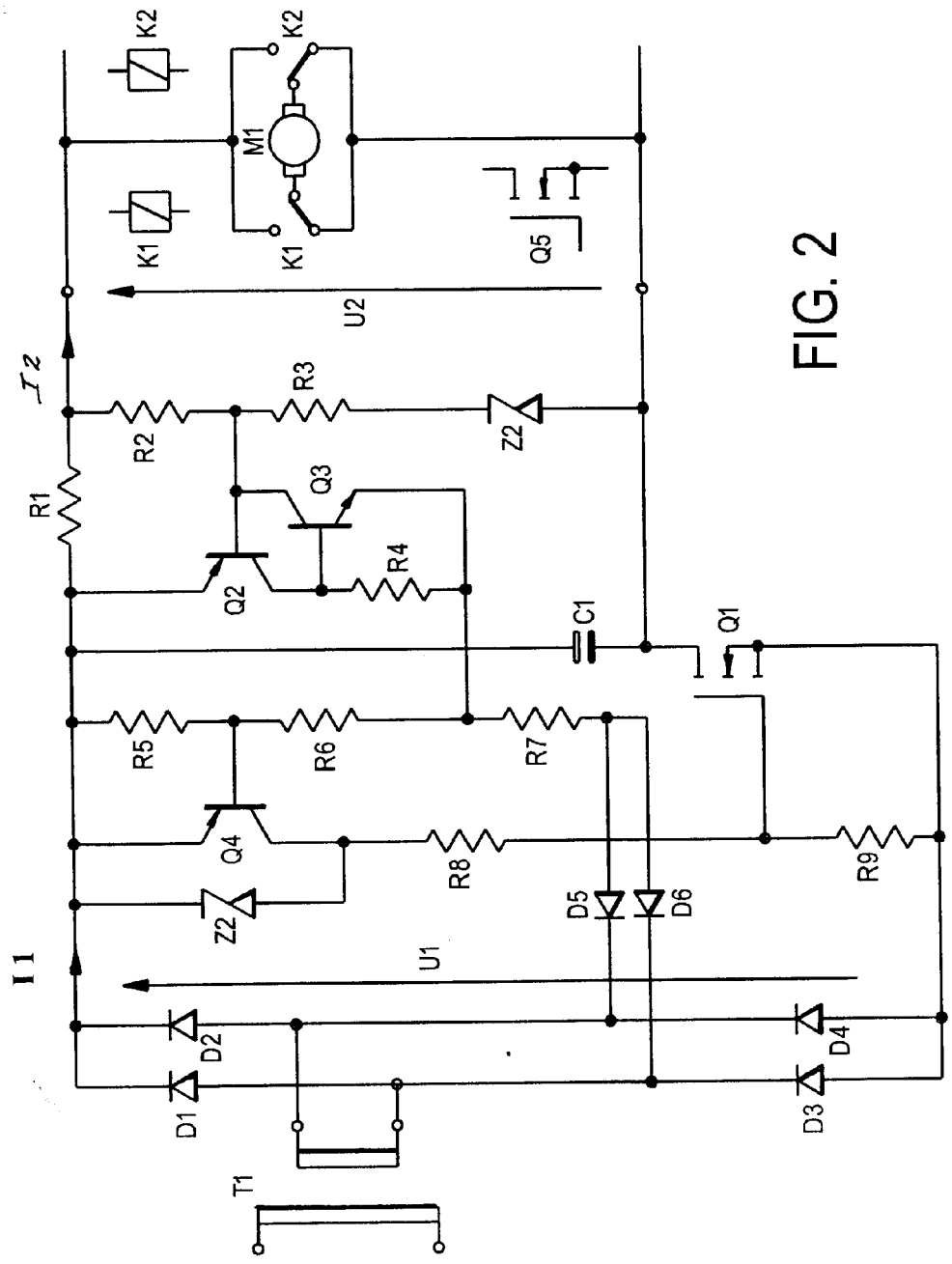
Figure 6:
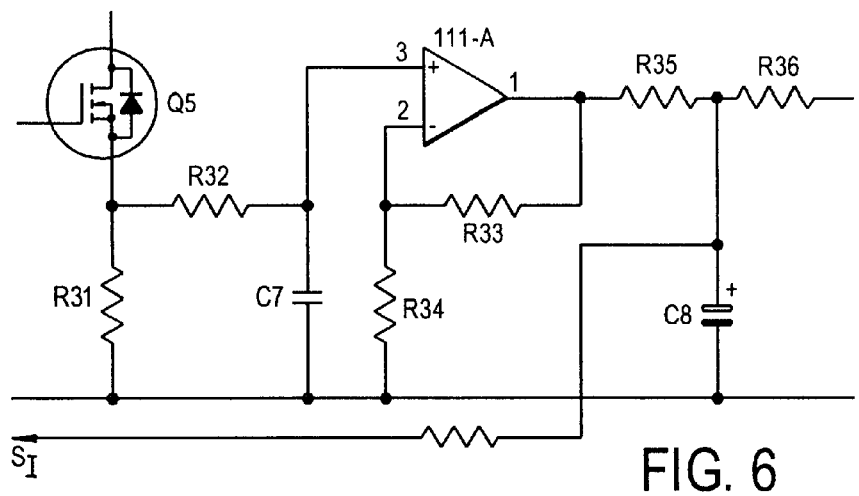
Figure 7:
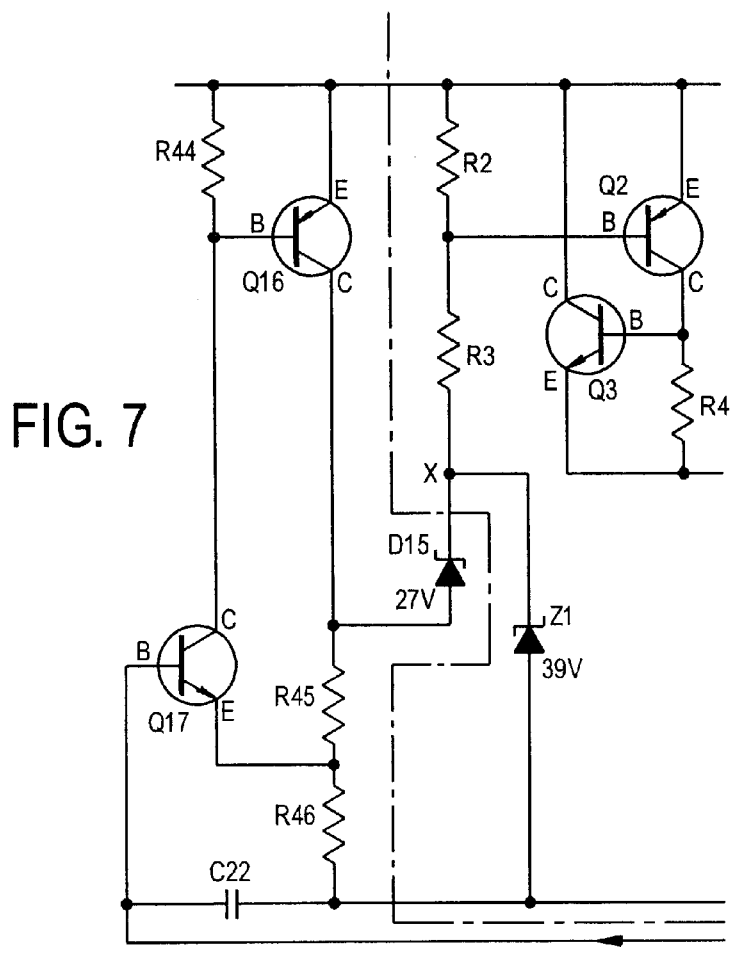

The invention will be explained more fully below with reference to the accompanying drawing. In the drawing:

FIG. 1 shows a height-adjustable table,

FIG. 2 shows a diagram of an embodiment of the power supply according to the invention, FIG. 3 shows curves of the voltage and current course of the power supply, FIG. 4 shows a block diagram of the power supply according to the invention, FIG. 5 shows curves illustrating the mode of operation of the invention compared to that of a traditional power supply, FIG. 6 shows a measuring circuit for the invention, and FIG. 7 shows a control circuit for the invention.

FIG. 1 of the drawing shows an ordinary desk with a height-adjustable tabletop 1, which is carried at each end by a lifting column 2 integrated in an underframe 3. The lifting column has two telescopic links, viz. a stationary link 4 and an extensible link. The extensible link is moved by a linear actuator comprising an electric motor (DC) 5 which drives a spindle via a transmission. The spindle has a nut thereon to which a piston rod is secured. The actuator as a whole is secured to the stationary link, while its piston is secured to the extensible link. The level displacement of the tabletop is thus determined by the stroke of the piston rod.

The actuator is connected to the mains voltage via a power supply 6, and the level of the tabletop may be adjusted up and down by a control panel 7.

The basic structure of the power supply appears from the diagram shown in FIG. 2. The power supply, where typical current sizes are up to 30 amperes and the mean output current is up to 10 amperes, is based on a ring or E-core transformer T1 having a primary side for connection to the mains and a secondary side for connection of one or more DC motors with a set of relays K1, K2 for controlling the direction of rotation of the motor, e.g. as stated in the applicant's European Patent Application No. 99610013.7. On the secondary side, there is a bridge-coupled rectifier D1–D4 for rectification of the alternating voltage, and subsequently a buffer capacitor C1 for smoothing the rectified alternating voltage, which is quite traditional. In parallel with the motor there is a Zener diode Z1 which, via a controller, controls a FET transistor Q1 inserted in series with the rectifier and the buffer capacitor.

As will appear, the FET transistor is arranged with the source connected to minus on the Graetz coupling. This means that an N-channel FET transistor 100% On may be controlled limited to a just 20 m ohmic loss. The essence is precisely that regulation is performed in the range 100% connected for necessary and desired voltage limitation. This results in a really high efficiency of the entire power supply.

It should be noted that the transformer constitutes a galvanic separation front the mains supply, just as it serves as a mains noise filter for conducted noise, and the secondary winding serves as a current-limiting impedance against direct connection of the buffer capacitor.

Considering a sine half-wave, the voltage increases across the motor and the buffer capacitor, the gate on the FET transistor Q1 being active as a starting point. Simultaneously, voltage is applied to the Zener diode Z1, and when the Zener voltage, which is 39 volts here, is reached, the controller is activated, causing the gate to become low on the FET transistor. This interrupts the current to the motor M1 and the buffer capacitor C1, to which voltage is still applied. When the voltage, the sine curve, is zero again, the gate on the FET transistor Q2 is reactivated, and a new cycle begins.

More particularly, Q1 serves as a switching element for the connection of the rectifier D1–D4 to the buffer capacitor C1. The gate of the FET transistor Q1 is connected when sufficient voltage is available across the secondary winding of the transformer via D5,D6,R7,R6;R5Q4,R8 and R9. The buffer capacitor C1 is hereby charged to the voltage U2, which may be used as a common voltage supply for one or more motor H-bridges, where the relays K1 and K2 determine the direction of rotation. The H-bridges may be provided with an individual switch arrangement in the form of a FET transistor Q5.

The control circuit may be in various configurations, where the lock may alternatively be arranged in connection with the FET gate. Finally, the PET switch frequently serves as a primary interrupter of energy supply to the actuators (first error safety).

The Zener diode Z1 limits the voltage U2 via R3,R2, Q2,Q3 and R4 shunting the base voltage divider R5,R6 to Q4, which means that the FET transistor Q1 is interrupted for the remaining sine half-wave. The lock R2,Q2,Q3,R4 in series with R7,D5 and D6 is released when the sine voltage passes zero crossing, and thus a new cycle can begin.

As a protective measure against excess voltages caused by the stray inductance of the transformer in connection with the interruption of the switch Q1, a Zener diode Z2 having a Zener voltage of 56 volts is inserted.

A measuring resistor R1 may be inserted in the controller between the buffer capacitor C1 and the motor connection, said measuring resistor R1 causing soft start of the motor, as R1 serves as a current limiter of the output current. The purpose of the current limiter is to protect the magnets in the motor against demagnetization caused by peak currents, if any. In addition, the current limiter causes the connection of the actuator to take place with a comfortable acceleration without violent jerks. Further, the current limiter contributes to preventing inexpedient drawing of current from the transformer. In general, the current limiter will not be operative during normal running, apart from motor connection or unintentional motor blocking. Finally, the current limiter serves as a power limiter for all loads.

In the off course after a great drawing of current the FET transistor briefly operates in analogue mode together with Z2 in series with R8, so that the reaction voltage across the secondary winding of the transformer is limited to below 70 volts. This also causes the induction voltage of the primary winding to be eliminated. During the analogue period, the current diminishes evenly toward currentless, and this means that noise flanks are not generated. In addition, it protects the FET switch against undesired destructive excess voltages, also even if they originate from the primary side on the transformer.

FIG. 3 of the drawing shows interrelated curves of the voltage and current course for the power supply shown in FIG. 2. The curves to the left illustrate a situation with a low load, corresponding to the lowering of a table, while the curves to the right illustrate a situation with a relatively high load, corresponding to the raising of a table with a load. U1 and I1 show voltage and current from the rectitier D1–D4 and U2 and I2 voltage and current after the phase cutter.

The power supply as such satisfies the future requirements of power factor correction. As an eventuality, there is a direct possibility of improving the power factor by supplementing the circuit with a capacitor, a choke coil and a diode.

In certain structures it is desirable to have a battery backup in case of power failure on the mains or an alternative battery operation, if connection to the mains is not possible at the moment. This is possible in that the reset signal to the lock Q2 and Q3 via the resistor R7 is formed in a separate synchronization circuit, so that the FET transistor Q1 can also handle simultaneous or alternative battery operation. The battery is connected in series with a diode across U1, but with the plus pole connected after an optional measuring resistor R1.

A further development of the invention is shown in the block diagram in FIG. 4, where the motor M1 is connected to the circuit mentioned above (called phase cutter below) across an H-bridge by a set of relays K1, K2 for the control of the motor, e.g. as described in the applicant's European Patent Application No. 99610013.7. The H-bridge is connected across the FET transistor Q5 to a measuring circuit for measuring the current motor power. A signal output from the measuring circuit is connected to the phase cutter across a control for controlling the voltage of the phase cutter to the motor in response to the motor power, so that the motor speed and thereby the speed of the lifting column are kept constant for loads up to the maximum output of the transformer. For loads above the output of the transformer, the speed decreases in step with the load.

The effect of the invention appears from the three sets of curves shown in FIG. 5 of the drawing, where the set of curves to the left represents a traditional power supply with full-wave rectification and a butter capacitor, while the set of curves shown in the centre applies to the first-mentioned embodiment, and the set of curves to the right represents the power supply according to the second embodiment with progressive control of the voltage. The upper curves show the conditions for the power supply, while the curves therebelow show the conditions for the table. As will appear, the first embodiment provides a more even speed and the second embodiment provides a constant speed over a considerable range of the output of the motor.

As mentioned, the motor current is measured by the measuring circuit on the output of the FET transistor Q5. This measuring circuit is shown in FIG. 6. The voltage is measured as an indication of the motor current, said voltage being directly proportional to the current. The measurement takes place with a shunt resistor R31. The signal from the measurement is simultaneously used in a traditional manner for an overload protection of the motor, where the current to the motor is interrupted when it exceeds a predetermined maximum size. The signal for controlling the phase cutter is taken from the measuring circuit after an operational amplifier U1-A.

The signal $S_f$ from the measuring circuit is fed to the control circuit which controls the phase cutter. The signal is amplified in a transistor amplifier, where the transistors Q16 and Q17 are coupled such that they do not consume power in a position of rest. The signal is fed from the amplifier to a node X via a Zener diode D15 having a Zener voltage which is smaller than the Zener voltage of the phase cutter. When the voltage at the node exceeds the Zener voltage of the phase cutter, this will take over. If the Zener diode Z of the phase cutter has a Zener voltage of e.g. 39 volts and the Zener diode G15 a voltage of 27 volts, the phase cutter will take over when the amplified measuring signal exceeds 12 volts. If the signal is below 12 volts, the phase cutter will close earlier than it would otherwise have done because of the bias of the Zener diode of the 27 volts.

The described structure allows a lifting column based on a linear actuator to keep a constant speed of the order of 70 mm/s in the loading area of the order of 0 to 800N.

The invention thus provides a low-cost power supply which simultaneously gives a plurality of various possibilities that may be used to advantage in specific structures. Alternatively or in combination with the Zener diode Z1, various alternative or supplementary voltage references can make it possible to achieve unique power supplies, current/voltage characteristics in addition to time-controlled voltage curves (e.g. soft start/stop curves).

As regards first error security against high voltages from the control, it is noted that this is allowed for elsewhere in the overall control.

Although the invention has been described above particularly in connection with lifting columns for tables, it is evident that the invention may find general application in connection with power supplies for electric motors.

Patent claims:

1. A power supply for DC actuator motors for furniture comprising a transformer (T1) having a primary side for connection to a mains voltage (AC) and a secondary side with a rectifier (D1–D4) for producing sine half-waves and a buffer capacitor (C1) having a terminal for at least a motor (M1) and a terminal for a control for connection and disconnection of the motor, wherein the power supply comprises a voltage/current limiter coupled in parallel with the motor (M1) and connected to switch means, so that the motor (M1) is connected on the occurrence of a first part of the sine half-waves, but is disconnected when the voltage determined for the voltage/current limiter is reached.

2. A power supply according to claim 1, characterized in that the voltage limiting means are formed by a Zener diode (Z1).

3. A power supply according to claim 1, characterized in that the switch means comprise a FET transistor (Q1) having a gate arranged such that current is supplied to the motor (M1) when the gate is high, while the current to it is interrupted when the gate is low.

4. A power supply according to claim 3, characterized in what the FET transistor (Q1) is controlled by a control circuit composed of bipolar transistors and resistors (R3,R2, Q2,Q3,R4).

5. A power supply according to claim 1, characterized in that a measuring resistor (R1) is inserted in the control circuit in the supply between the buffer capacitor and the motor connection.

6. A power supply according to claim 1, characterized in that a maximum voltage limiter (22), expediently a Zener diode, is inserted in series with the FET transistor (Q1).

7. A power supply according to claim 1, characterized in that an additional buffer capacitor, a choke coil and a diode are inserted.

8. A power supply according to claim 1, characterized in that additional parametric voltage references are provided in connection with the Zener diode (Z1) or as an alternative to it.

9. A power supply according to claim 8, characterized in that a reset signal for the lock (Q2, Q3, R7) in the control circuit is formed in a separate synchronization circuit for simultaneous or alternative battery operation exclusively with the FET transistor (Q1) as a switch.

10. A power supply according to claim 9, characterized in that the FET transistor (Q1) may be forced to be interrupted by the control circuit.

11. A power supply according to claim 10, characterized in that the power supply comprises means for measuring the current power in the motor, said measurement being used as a feedback for controlling the motor voltage so that the speed of the motor is kept constant.

12. A power supply according to claim 11, characterized in that there is a measuring circuit for measuring the current to the motor for overload protection of it, and that a signal from this measuring circuit is used as a feedback for controlling the motor voltage.

* * * * *

UNITED STATES PATENT AND TRADEMARK OFFICE
CERTIFICATE OF CORRECTION

PATENT NO. : 6,509,705 B2
DATED : January 21, 2003
INVENTOR(S) : Bastholm et al.

It is certified that error appears in the above-identified patent and that said Letters Patent is hereby corrected as shown below:

Drawings,
Sheet 2 of 4, Fig. 2, add reference numbers I1 and I2 as per the attached drawing sheet.
Sheet 4 of 4, Fig. 7, extend the dotted line as per the attached drawing sheet.

Signed and Sealed this

Thirteenth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,509,705 B2  Page 1 of 1
DATED : January 21, 2003
INVENTOR(S) : Bastholm et al.

It is certified that error appears in the above-identified patent and that said Letters Patent is hereby corrected as shown below:

Column 7,
Line 56, delete "for furniture".

Signed and Sealed this

Fifth Day of August, 2003

JAMES E. ROGAN
*Director of the United States Patent and Trademark Office*